(12) United States Patent
Kress et al.

(10) Patent No.: US 6,503,030 B2
(45) Date of Patent: Jan. 7, 2003

(54) REAMER

(75) Inventors: Dieter Kress, Aalen (DE); Friedrich Häberle, Lauchheim (DE)

(73) Assignee: Mapal, Fabrik für Präzisionswerkzeuge Dr. Kress KG (DE)

( * ) Notice: Subject to any disclaimer, the term of this patent is extended or adjusted under 35 U.S.C. 154(b) by 2 days.

(21) Appl. No.: 09/873,665

(22) Filed: Jun. 4, 2001

(65) Prior Publication Data

US 2002/0012574 A1 Jan. 31, 2002

(30) Foreign Application Priority Data

Jun. 2, 2000 (DE) .......................... 100 27 592
Jul. 6, 2000 (DE) .......................... 100 33 012

(51) Int. Cl.$^7$ .............................................. B23B 51/02
(52) U.S. Cl. ...................... 408/188; 407/114; 407/115; 408/229; 408/713
(58) Field of Search ................ 407/114, 115; 408/187, 188, 223, 224, 227, 229, 230, 233, 713, 199

(56) References Cited

U.S. PATENT DOCUMENTS

| | | | | |
|---|---|---|---|---|
| 3,069,937 A | * | 12/1962 | Williams | 408/227 |
| 3,286,557 A | * | 11/1966 | Rietzler et al. | 408/188 |
| 3,656,859 A | * | 4/1972 | Rietzler et al. | 407/114 |
| 3,842,470 A | * | 10/1974 | Hertel | 407/104 |
| 4,199,284 A | * | 4/1980 | Kress et al. | 407/114 |
| 4,425,063 A | * | 1/1984 | Striegl | 407/113 |
| 4,971,483 A | * | 11/1990 | Kress et al. | 407/113 |
| 5,474,406 A | | 12/1995 | Kress | 408/199 |
| 5,494,383 A | | 2/1996 | Kress | 408/231 |

FOREIGN PATENT DOCUMENTS

| | | |
|---|---|---|
| DE | 4102716 | 8/1991 |
| DE | 4320511 | 12/1994 |
| DE | 19654323 | 6/1998 |
| EP | 0157114 | 10/1985 |

OTHER PUBLICATIONS

European Search Report No. EP 01 11 3038 dated Sep. 13, 2001.

\* cited by examiner

*Primary Examiner*—Daniel W. Howell
(74) *Attorney, Agent, or Firm*—Ostrolenk, Faber, Gerb & Soffen, LLP

(57) ABSTRACT

A reamer for the fine machining of surfaces of drilled holes in metal workpieces has a reamer body and at that body has at least one main blade and at least one auxiliary blade, a chip surface adjoining the blades at one side and a chip deflector step limiting the chip surface. That deflector step falls away in the zone of the auxiliary blade, exhibiting an increasing distance from the auxiliary blade. The chip deflector step rises in the zone of the main blade, exhibiting a decreasing distance from the main blade. The blades, chip surface and deflector step may be on a cutter plate attached to the reamer body or be part of the body itself. The invention also concerns that cutter plate.

20 Claims, 3 Drawing Sheets

REAMER

BACKGROUND OF THE INVENTION

The invention relates to a reamer for the fine machining of surfaces of drilled holes in metal workpieces, and particularly to the orientation of a chip deflector of the reamer.

Reamers of the type discussed herein are used for fine machining of surfaces of previously drilled holes, both through holes and blind holes in metal workpieces. The reamers comprise at least one main blade and at least one auxiliary blade. Frequently, such known reamers are provided with at least one cutter plate, which supports the main and auxiliary blades.

An important aspect of the fine machining of surfaces of drilled holes is controlling movement of the chips formed. The chips have to not only be broken but also transported away from the drilled hole being machined in such a manner that they cannot come between the tool and the surface of the drilled hole. In machining through holes and blind holes, different reamers are used to control the chip progression accordingly. The reamers are equipped with differently oriented main and auxiliary blades. These are disposed so that they do not run parallel to a plane intersecting the central axis or the axis of rotation of the tool but instead they enclose an acute angle with the axis. This configuration ensures a right-hand or a left-hand twist of the chips. In reamers that are provided with cutter plates, the cutter plates are disposed within the tool body so that they do not lie parallel to a plane intersecting the central axis or the axis of rotation of the tool but they instead enclose an acute angle with the axis, in order to ensure a right-hand or left-hand twist of the chips. It is apparent that the production of various tools for machining through holes and blind holes is elaborate and therefore cost-intensive.

SUMMARY OF THE INVENTION

It is an object of the invention to provide a reamer that does not exhibit the above described disadvantage.

To achieve this object, a reamer for fine machining of surfaces of drilled holes in metal workpieces is proposed which has a main blade extending back from the front end surface of the reamer body and rising in height followed by an auxiliary blade which meets the main blade at an apex or corner. The auxiliary blade descends at a very slight angle rearwardly from the apex with the main blade.

A chip transport surface adjoins the blades at the side to which the chips are urged by the blades.

A chip deflector step is provided at the edge of the chip transport surface. The chip deflector rises in the zone of the main blade in the direction toward the front of the reamer body, which means the step descends or falls off rearwardly. This means that the chip deflector step exhibits a decreasing distance from the main blade. The chip deflector step is so disposed that it also extends in the zone of the main blade at a decreasing distance from a theoretical continuation of an outer edge of the reamer again in the direction toward the front. This tool is simple and economical to produce.

The chip deflector step also extends rearwardly past the auxiliary blade and descends or drops off in the rearward direction, increasing the distance away from the auxiliary blade. A particularly preferred embodiment of the reamer includes at least one cutter plate, which encompasses the main and auxiliary blades. This cutter plate includes the chip deflector step which, as described above, rises forwardly in the zone of the main blade of the cutter plate, thereby exhibiting a decreasing distance in the forward direction from the main blade and from a theoretical continuation of the outer edge of the cutter plate.

In a preferred embodiment of the reamer, the chip deflector step is of linear extent or shape. As the chip deflector step is generally produced in a grinding operation, such a configuration is particularly economical to produce.

In a further preferred embodiment of the reamer, the cutter plate is disposed parallel to the central axis or axis of rotation of the reamer. It is therefore possible to equip existing reamers with a cutter plate of the type discussed here and to machine blind holes without a problem, since the chips formed in reaming can be easily removed. This even applies in conjunction with what is known as minimal volume flushing, in which relatively little flushing medium and coolant is used during the machining of the workpiece surface.

Other objects and features of the invention are described below with reference to the drawings.

DESCRIPTION OF PREFERRED EMBODIMENTS

Figure 1:
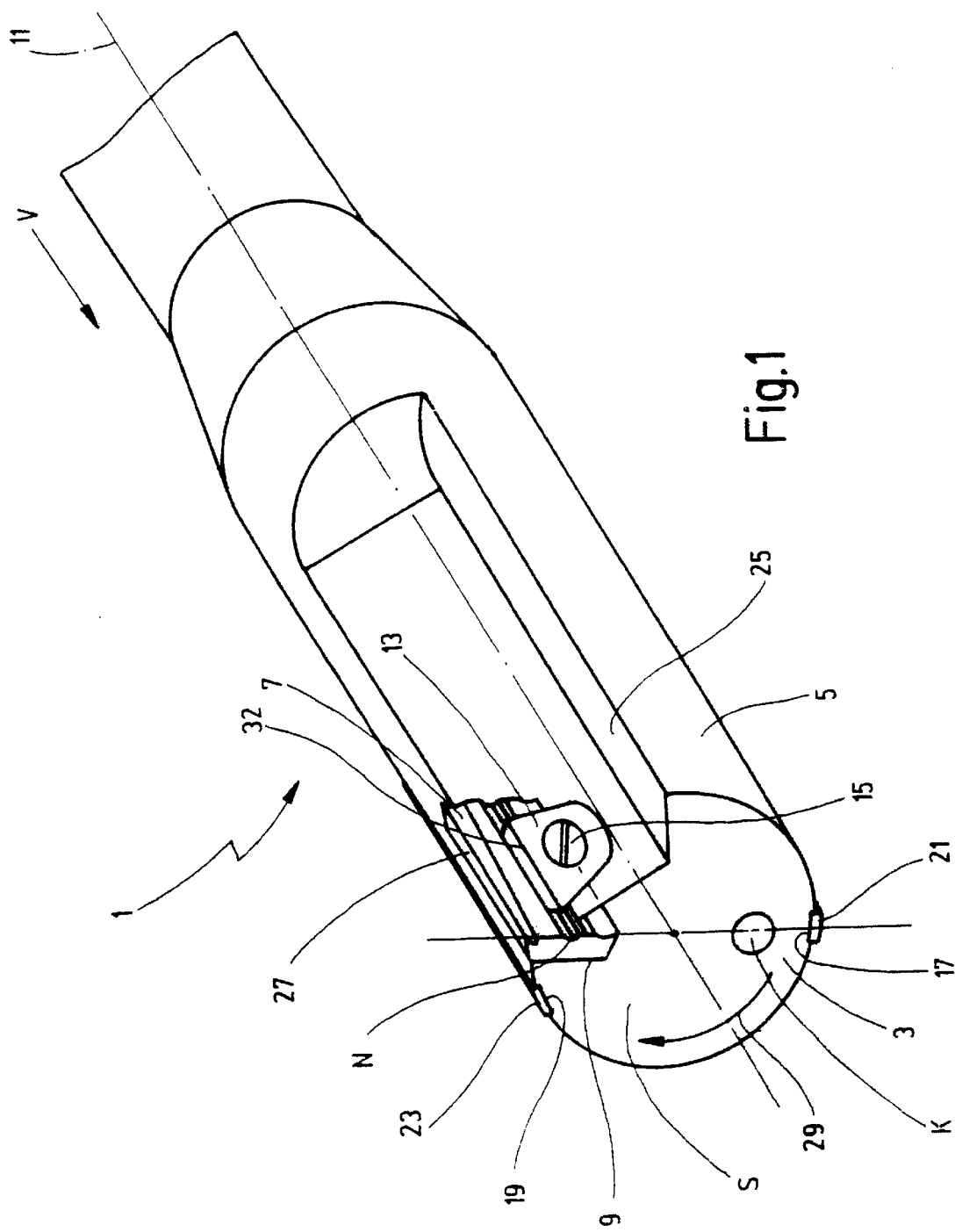
FIG. 1 is a perspective view of a first embodiment of a reamer.

FIG. 1 shows a first embodiment of a reamer 1 in an oblique frontal perspective view. Reamers of this general type are known, so that only brief details of the structure of this tool are provided. The reamer 1 has a base body 3 having a circumferential surface 5 into which a cutter plate 7 is inserted. The plate 7 is inserted into a groove 9 in the body that is disposed in a theoretical plane that intersects the central axis or axis of rotation 11 of the reamer 1 or does not intersect it but is parallel to that axis. Thus, the cutter plate 7 in the groove also lies in this theoretical plane or parallel to it. The cutter plate 7 is secured in the groove in a customary manner by a clamping plate 13, which is attached to the base body 3 by a clamping screw 15. In principle, the cutter plate 7 is adjustable radially by at least one set-screw and an associated setting wedge (not shown), so that the plate can be readjusted, by being moved radially outwardly, in the event the plate is worn. Two guide strips 21 and 23 are inserted into respective grooves 17 and 19 that extend lengthwise of the reamer 1. The length of the strips 21 and 23 is generally longer than the length of the cutter plate 7, measured along the direction of the central axis 11.

A generally segment shaped or open region recess 25 extends in the lengthwise direction in the base body 3. It is w known as a chip space and transports away the chips formed during the machining of a metal workpiece.

For machining workpieces, relative movement is necessary between the surface of a drilled hole to be machined and the blade 27 of the cutter plate 7. It is thus possible to hold the tool stationary while causing the workpiece to rotate. Usually, however, the workpiece is clamped while the rotating reamer 1 is introduced into the already drilled hole that is to be machined. In this case, the reamer 1 rotates, in the direction of the arrow 29, so that the blade 27 removes chips from the surface of the drilled hole to be machined. These chips then pass into the chip space or the recess 25. An appropriate, virtually mirror-image design of the reamer makes it of course also possible to rotate the reamer in the opposite direction.

Figure 2:
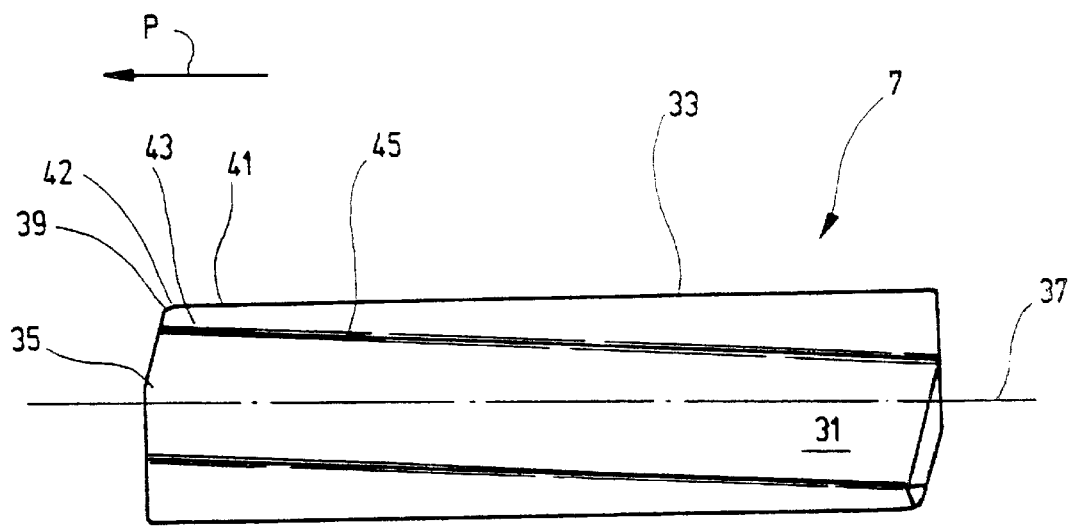
FIG. 2 is a view of the front side or cutter front of a cutter plate used with a reamer according to FIG. 1.

The cutter plate 7 that is inserted into the reamer 1 is shown in an enlarged view in FIG. 2. The front side or cutter front 31 of the cutter plate 7 is shown. The clamping plate 13 or its clamping lip 32 are applied to that side 31. The chips are directed toward the side 31 as the reamer rotates.

The groove N indicated in FIG. 1, which extends in the lengthwise direction of the cutter plate 7 and which receives the clamping plate 32, has been omitted from FIG. 2 for simplicity.

The cutter plate 7 is of substantially rectangular form. For example, it is a reversible plate, with a left-hand upper edge and an opposite right-hand bottom edge which are used for fine machining workpieces. As these two edges are identical in form, only the left-hand upper edge is explained below.

The upper lengthwise edge 33 of the cutter plate 7 falls away or descends to the left in the zone of the front side 35 of the cutter plate 7 in the direction of advance. In other words, the distance of the side 35 from the center line 37, which line is shown as a broken line, of the cutter plate 7 decreases. When a workpiece is being machined, that is, this zone falls away in the direction in which the reamer 1 with the cutter plate 7 is being advanced forward relative to the workpiece. At the edge of the zone 35 is a main blade 39. The direction of advance is indicated in FIG. 2 by an arrow P and in FIG. 1 by an arrow V. The main blade 39 falls away or descends to the center line 37 in the direction of advance P.

To its right or rearward, the main blade 39 is adjoined by an auxiliary blade 41, which falls away or descends very slightly counter to the direction of advance indicated by the arrow P. Its distance from the center line 37 thus decreases slightly from left to right. This prevents the cutter plate becoming jammed in the drilled hole. The conflicting fall aways of the blades 39 and 41 define an apex 42 between the main blade 39 falling away to the left and the auxiliary blade 41 to the right. As this arrangement of main and auxiliary blades is known in principle, no details are provided here. The main blade 39 serves for premachining the surface of the drilled hole that is to be machined, and the auxiliary blade 41 serves for the fine machining and finishing.

The upper lengthwise edge 33, or the main blade 39 and the auxiliary blade 41, are adjoined by the chip surface 43 which lies on the front side of the cutter plate 7, i.e., the side toward which the chips are discharged. The chips removed by the blades run along the surface 43. There is a chip deflector step 45 provided at a distance from the blades or from the lengthwise edge 33. The chips removed by the blades 39 and 41 run down the chip surface 43 and impact against the step 45 where they are broken. In addition, the chips receive a movement impulse in a direction dictated by the inclination of the chip deflector step 45. The chip deflector step 45 encloses an acute angle with the center line 37. That angle opens toward the left above the center line 37 in the advance direction. The chip deflector step 45 thus is spaced a distance from the upper lengthwise edge 33 of the cutter plate 7, and that distance increases from left to right. That acute angle between the chip deflector step 45 and the lengthwise edge 33 is in a range of approximately 1° to 5°, and preferably of approximately 3°. This inclination of the step deflects both the chips removed by the main blade 39 and those removed by the auxiliary blade 41 to the right or rearwardly, and the chips are transported away by the front side 35 of the cutter plate 7 toward the right in FIG. 2, rearward, counter to the direction of advance shown by arrow P. This is advantageous, especially in the machining of blind holes, because the chips can be particularly easily transported away from the zone to be machined, without a backup of chips or resultant damage to the workpiece surface to be machined, caused by chips coming between the tool or cutter plate and/or guide strip and drilling surface.

Control over chip progression is also ensured in the zone of the main blade 39 because all chips are transported away toward the right. This is because the chip deflector step 45 rises in the advancing direction of the arrow P not only in the zone of the auxiliary blade 41 but also in the zone of the main blade 39 thereby exhibiting a decreasing distance from the main blade 39 in the advancing direction. In other words, the distance between the chip deflector step 45 and a theoretical continuation of the upper lengthwise edge 33 reduces here continuously to the front or leading side 35 of the cutter plate 7. Conversely, the distance between the chip deflector step 45 from the center line 37 increases here continuously from right to left, in other words especially also in the zone of the main blade 39. Measured perpendicularly to the center line 37, the width of the chip surface between main blade 39 and chip deflector step 45 is between approximately 0.4 mm to a maximum of 0.5 mm. These values apply to cutter plates 7 that are approximately 20 mm long and 10 mm wide.

The perspective view from the left-hand upper edge of the cutter plate 7 in FIG. 3 again shows the relationships in detail:

The lengthwise edge 33 forms the auxiliary blade 41 in the zone at the front side 35 of the cutter plate 7 and forms the main blade 39. The upper lengthwise edge 33 and the blades 39 and 41 correspond to the line of section of the chip surface 43 and to a first free surface zone 47. The zone 47 is adjoined by a second free surface zone 49. The free surface zones 47 and 49 lie in the zone of the lengthwise sides of the cutter plate 7.

Figure 3:
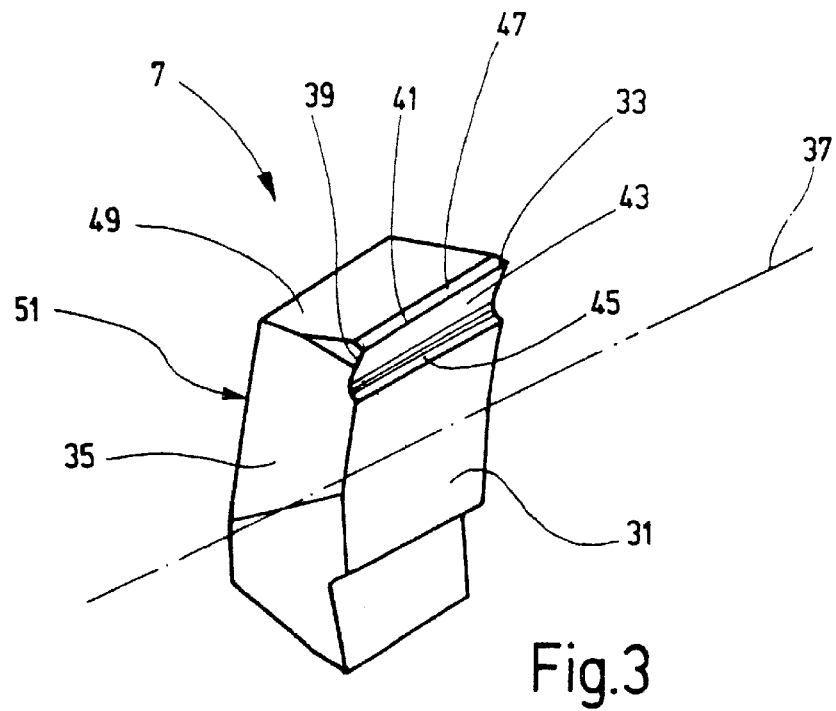
FIG. 3 is a perspective view of the front cutting zone of the cutter plate shown in FIG. 2.

The first free surface zone 47 falls away from the upper lengthwise edge 33 at an acute angle toward the left in FIG. 3, and inclines toward the central axis 37 or toward the rear side 51 of the cutter plate 7 which is opposite the cutter front 31. The second free surface zone 49 falls away to the rear side 51 at a steeper angle. The free surface zones are inclined in a known manner, as described here, so that the cutter plate 7 or reamer 1 does not become jammed in the drilled hole to be machined. The very narrow first free surface zone 47 also supports the reamer 1 in the drilled hole to be machined.

FIG. 3 shows that the chip deflector step 45 follows a linear course over the whole length of the auxiliary blade 41 and of the adjacent main blade 39. It is also possible in principle for the chip deflector step 45 to bend downwardly toward the center line 37 and particularly between the front and rear edges of the main blade, in the most forward zone of the step 45, toward the front side 35. The bending point here, however, lies closer to the front side 35 of the cutter plate 7 than the apex 42 between main blade 39 and the auxiliary blade 39, to ensure that all chips removed by the main blade 39 impact upon the chip deflector step 45 and fall away to the right and are thus conveyed away toward the right. By "right" here is meant the direction extending counter to the direction of advance, which is indicated by the arrow P in FIG. 2.

In view of the foregoing, it is apparent that the reamer 1 is ideally suited for use in the machining of blind holes. The chips that are removed from the workpiece bore surface to be machined are reliably transported away from a blind hole counter to the direction of advance, even if only minimal volume flushing is provided during the machining of the workpiece, in which very much less coolant or lubricant is used by comparison with conventional cooling or flushing. This coolant emerges, for example, from a channel K which opens at the end face S of the reamer 1.

The reamer 1 can also be used for machining through holes, wherein the cutter plate 7 described here is replaced by a modified form of the cutter plate in which the chip deflector step 45 falls away forward, in the direction of the arrow P, at least in the zone of the main blade 39 to thus deflect the chips removed by the main blade 39 toward the left, in the direction of advance, i.e., in the direction of the arrow P. The fall away here is in the forward, advancing direction, contrary to the embodiment in FIGS. 2 and 3.

Because the cutter plate 7 extends virtually parallel to the central axis or axis of rotation 11 of the reamer 1, the reamer 1 can be used for machining both blind holes and through holes. The cutter plate 7 described here is advantageously used for machining blind holes. The chips formed are reliably transported away counter to the direction of advance by the chip deflector step 45 rising in the direction of advance. Additional measures, in particular especially strong flows of flushing medium running counter to the direction of advance, are no longer required in the tool hereof.

In machining through holes, the cutter plate may be provided with a chip deflector step 45 that rises in the opposite direction to deflect the chips forward in the direction of advance and transport them away.

Exchanging cutter plates for the machining of blind and through holes is particularly simple because the latter do extend virtually parallel to the axis of rotation of the reamer. The base body of the reamer is thus identical for the machining of the two types of holes.

In view of the foregoing, it is apparent that the cutter plate 7 can be produced especially simply and economically, especially when the chip deflector step 45 is formed continuously in a linear manner over the entire length of the cutter plate, so that it can be produced in a simple grinding operation.

The first embodiment of the reamer 1 described above has a cutter plate 7 and two guide strips 21 and 23. The first strip 21 follows the cutter plate 7 at a distance of approximately 40° relative to the direction of rotation in the direction of the arrow 29, and the second strip 23 follows at a distance of 180°. It is also possible to equip reamers with more than only a single cutter plate and more than only two guide strips.

From the foregoing, it becomes apparent that the advantages of the specially equipped chip deflector are effective not only in reversible plates that are retained by a clamping plate but also in fixedly soldered-in cutter plates that exhibit the features described here.

Figure 4:
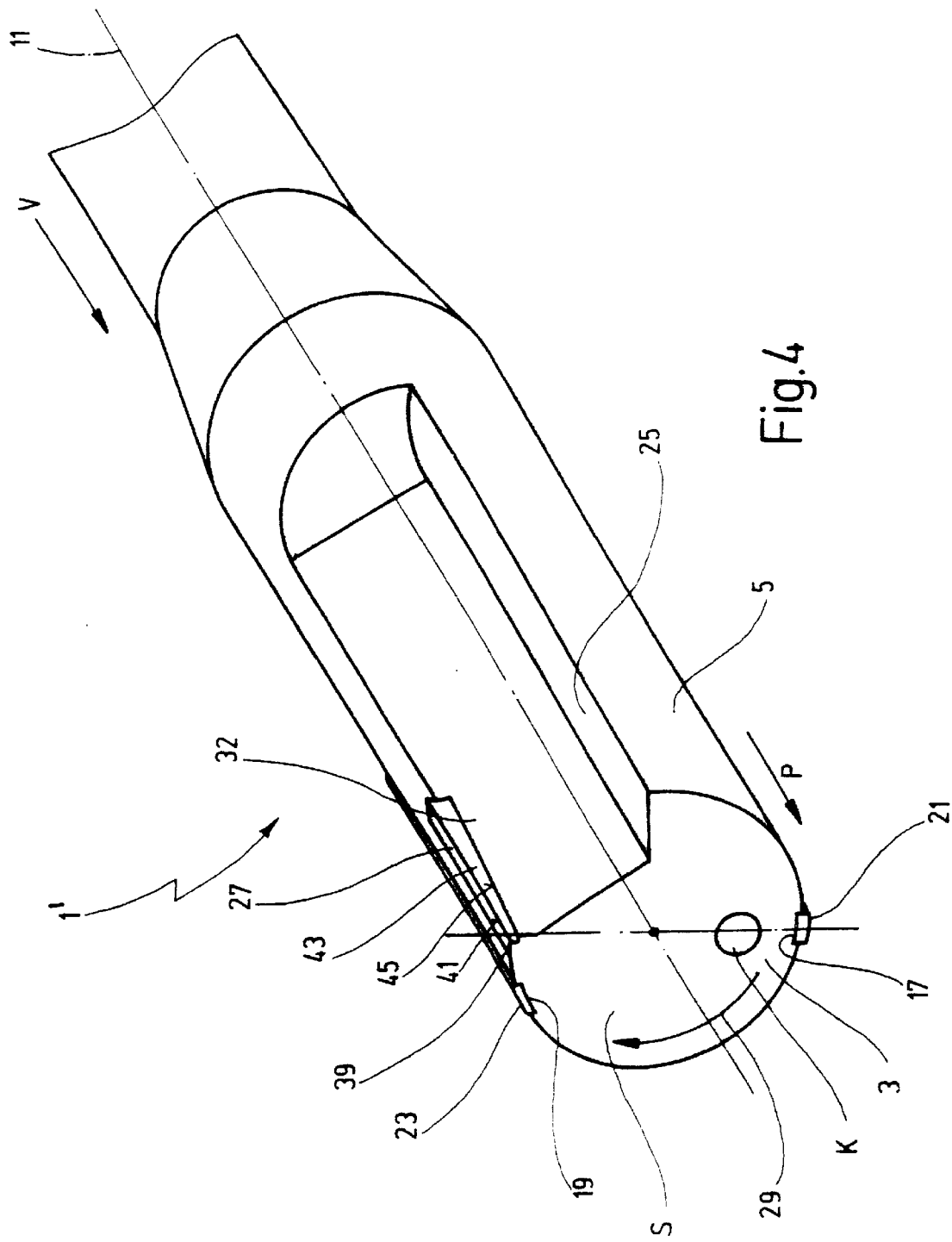
FIG. 4 is a perspective view of a second embodiment of a reamer of the invention.

FIG. 4 shows a second embodiment of a reamer 1'. This tool substantially corresponds to that in FIG. 1, and identical parts are provided with identical reference numbers. The differences between the two embodiments are described.

The reamer 1' shown in FIG. 4 is notable in that a cutter plate, described with reference to the previous Figures, is not included. In the reamer 1' a blade 27 projects above the circumferential surface 5 of the base body 3 and extends over a certain length of the base body, measured along the direction of its axis of rotation 11. The blade here is machined from the solid metal of the body. No provision is therefore made here for inserting a cutter plate, as described above, into the base body 3 of the reamer 1'.

The second embodiment shown in FIG. 4 has a single blade 27. However, a plurality of blades may be provided spaced apart in the circumferential direction and all projecting above the circumferential surface 5. Again, two guide strips 21 and 23 are illustrated inserted into grooves 17 and 19 provided in the base body 3 for this purpose. More than two guide strips may also be provided.

As explained with reference to FIGS. 2 and 3, the blade 27 comprises at least one main blade 39 and one auxiliary blade 41, although these are not clearly visible in FIG. 4. A chip surface 43, directly adjoins the blade 27 and it is limited by a chip deflector step 45.

The chip deflector step 45 rises in the direction V of advance of the reamer body, from right to left in FIG. 4, or in other words, it exhibits a decreasing distance from the blade 27, especially from the main blade 39, which is arranged in the front end zone of the blade, in other words in the zone of the blade 27 that faces the end face S of the reamer 1'.

The blade 27 is adjoined by a first free surface zone 47 and a second free surface zone 49, both not shown in FIG. 4 but explained with reference to FIG. 3. Otherwise, reference is made to the description relating to FIG. 2 for the course of the chip deflector step 45.

In the second embodiment of the reamer 1' in FIG. 4, the blade 27, the chip surface 43 and the chip deflector step 45 are of identical form as explained with reference to FIGS. 1 to 3 to illustrate the example of a cutter plate 7. The only difference between the reamer 1' of FIG. 4 and the reamer 1 of FIG. 1 is that the blade 27 does not form part of a cutter plate but has been machined directly from the base body 3 of the reamer 1'. Similarly, the other contours, the chip surface 43 and the chip deflector step 45 are also machined from the base body 3 of the reamer 1'.

The reamer 1' of FIG. 4 is notable in that, during machining of blind holes, the chips formed are reliably transported away counter to the direction of advance of the reamer 1'. It is therefore not necessary to adopt additional measures, like ensuring a particularly strong flow of flushing medium directed counter to the direction of advance. The specific arrangement of the chip deflector step 45 ensures that even in the event of minimal volume flushing, during machining of a blind hole, the chips removed from the workpiece surface to be machined are reliably transported away counter to the direction of advance, so that adverse effects on the workpiece surface to be machined are avoided.

The reamer 1' of FIG. 4 can also be used for machining through holes if the chip deflector step 45 falls away forward, in other words in the direction of the arrow P, at least in the front zone of the main blade 39. Thus, the explanations for reamer 1', described with reference to FIGS. 1 to 3 apply here. In the reamer 1' FIG. 4, the arrangement of the chip deflector step 45 ensures that chips formed in the zone of the main blade 39 are always transported away toward the right, counter to the advancing direction of the arrow P. The chip deflector step 45 rises not only in the zone of the auxiliary blade 41 but also in the zone of the main blade 39, viewed in the direction V of advance, thus exhibiting a decreasing distance from the main blade. Thus, the distance between the chip deflector step 45 and the blade 27 decreases continuously to the front end face S of the reamer 1'. The distance of the chip deflector step 45 from the central axis 11 accordingly also increases continuously from left to right here, especially also in the zone of the main blade 39. The width of the chip surface 43 between the main blade 39 and the chip deflector step 45, measured perpendicularly to the blade 27, is between approximately 0.4 mm to a maximum of 0.5 mm. These values apply to blades 27 that are approximately 20 mm long.

It should be reemphasized that the arrangement and configuration of the chip deflector step 45 relative to the blade 27 or to the main blade 39 and auxiliary blade 41 in FIG. 4 are identical to FIG. 1, which is equipped with a cutter plate 7. In particular, it is also possible to provide a reamer for machining through holes. The chip deflector step need only have an opposite inclination and fall away in the direction of advance. Again, the chips are deflected in the direction of the arrow P. In both cases, the blades lie substantially parallel to the axis of rotation of the reamer. Moreover, in both alternative embodiments, the reamer 1' may also have more than one blade and more than two guide strips and that it can also be of virtually mirror-image configuration in order to permit an opposite direction of rotation in the machining of surfaces of drilled holes. FIG. 4 shows an example of a reamer 1' which, for machining surfaces of drilled holes, rotates in the direction of the arrow 29, clockwise when viewed from the front.

In the second embodiment of reamer 1' of FIG. 4, the base body 3 of the reamer 1' is comprised of hard metal, that is, at least the blade 27 and the zones adjacent thereto, and for example the chip surface 43 and the chip deflector step 45, may be provided with a coating of hard metal. Such a coating is known for cutter plates, and no further details are given here.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A reamer for fine machining of surfaces of drilled holes in workpieces, the reamer comprising:
   a base body for being advanced in a drilled hole to be reamed; the body having a front side which is advanced into the hole;
   a main blade supported toward the front side of the reamer body;
   an auxiliary blade behind the main blade with respect to the front side of the reamer body, such that the drilled hole is first reamed by the main blade and thereafter is reamed by the auxiliary blade as the reamer body is advanced through the drilled hole;
   each of the main and auxiliary blades having a same respective side toward which chips are directed by the blades reaming the hole; a chip surface adjoining both of the blades on the side toward which the chips are directed by the main and auxiliary blades and the chip surface extending inwardly toward the axis of the reamer body;
   a chip deflector step limiting the extent of the chip surface, the step being spaced away from the blades and extending along the length of the blades; the deflector step falling away in a first zone of the body over which the auxiliary blade extends to exhibit an increasing distance from the auxiliary blade in the direction opposite advancing of the reamer body, and the deflector step being further oriented to rise in a second zone of the reamer body over which the main blade extends to exhibit a decreasing distance from the main blade, in the direction of advance of the reamer body.

2. The reamer of claim 1, wherein the body has an axis, and the main blade is oriented so as to rise away from the axis of the reamer body in the direction opposite advancing of the reamer body, and the auxiliary blade not rising with reference to the main blade, and the main and auxiliary blades meeting at an apex rearward from the front side of the reamer body.

3. The reamer of claim 1, wherein the main and auxiliary blades are integrally formed with the reamer body.

4. The reamer of claim 1, wherein the reamer body has an axis, and the deflector step is of linear configuration extending along the axis of the reamer body.

5. The reamer of claim 1, further comprising a cutter plate supported to the reamer body; the main and auxiliary blades, the chip surface and the deflector step all being defined on the cutter plate.

6. The reamer of claim 5, wherein the reamer body has an axis, and the deflector step is of linear configuration extending along the axis of the reamer body.

7. The reamer of claim 6, wherein the chip deflector step encloses an acute angle with a center line of the cutter plate that extends through the cutter plate in the direction along the axis of the reamer body.

8. The reamer of claim 7, wherein the acute angle is of approximately 1° to 5°.

9. The reamer of claim 7, wherein the acute angle is approximately 3°.

10. The reamer of claim 6, wherein the chip deflector step extends continuously and linearly over the entire length of the main blade in the direction along the axis of the reamer body.

11. The reamer of claim 10, wherein the chip deflector step extends continuously and linearly over the entire length of the auxiliary blade in the direction along the axis of the reamer body.

12. The reamer of claim 6, wherein the chip deflector step extends continuously and linearly over the entire length of the auxiliary blade in the direction along the axis of the reamer body.

13. The reamer of claim 4, wherein the body has an axis, and the main blade is oriented so as to rise away from the axis of the reamer body in the direction opposite advancing of the reamer body, and the auxiliary blade not rising with reference to the main blade, and the main and auxiliary blades meeting at an apex rearward from the front side of the reamer body;
   the cutter plate has a front side toward the front side of the reamer body and the chip deflector step bends downward forward of the apex and behind the front side of the cutter plate.

14. The reamer of claim 13, wherein the body has an axis, the main blade is oriented so as to rise away from the axis of the reamer body and away from the front side of the reamer body, and the auxiliary blade not rising with reference to the main blade, and the main and auxiliary blades meeting at an apex rearward from the front of the reamer body;
   the bending point of the chip deflector step lies closer to the front side of the cutter plate than to the apex between the main blade and the auxiliary blade.

15. The reamer of claim 1, wherein the cutter plate is a reversible plate having a respective one of the main blades, auxiliary blades, chip surface and deflector step on opposite lateral edges of the cutter plate.

16. The reamer of claim 4, wherein the cutter plate is disposed parallel to a plane intersecting the central axis of a rotation of the reamer body or in a plane intersecting the axis of rotation of the reamer body.

17. A cutter plate for use in a reamer for fine machining of a surface of a drilled hole in a workpiece, wherein the cutter plate comprises a main blade supported at a front side of the plate and an auxiliary blade behind the main blade with respect to the front side of the plate, such that the drilled hole is first reamed by the main blade and thereafter is reamed by the auxiliary blade as the cutter plate is advanced through the drilled hole to be reamed;

each of the main and auxiliary blades having a same respective side toward which chips are directed by the blades reaming the hole; a chip surface adjoining both of the blades on the side toward which the chips are directed by the main and auxiliary blades, and the chip surface extending inwardly toward the axis of the reamer body;

a chip deflector step limiting the extent of the chip surface, the step being spaced away from the blades and extending along the length of the blades; the deflector step falling away contrary to the direction of advance of the cutter plate and in the zone over which the auxiliary blade extends so that the step has an increasing distance away from the auxiliary blade in a first zone of the plate away from the front side of the plate; and the deflector step being further oriented to rise in the direction of advance of the plate in a second zone of the plate over which the main blade extends to exhibit a decreasing distance from the main blade, viewed in the direction of advance.

18. The cutter plate of claim 17, wherein the deflector step is of linear configuration extending along the plate.

19. The cutter plate of claim 18, wherein the chip deflector step encloses an acute angle with a center line of the cutter plate that extends through the cutter plate.

20. The cutter plate of claim 19, wherein the chip deflector step extends continuously and linearly over the entire length of the auxiliary blade in the direction along the axis cutter plate.

* * * * *